(12) United States Patent
Arora et al.

(10) Patent No.: US 10,447,740 B2
(45) Date of Patent: Oct. 15, 2019

(54) SYSTEM AND METHOD FOR CALL TERMINATION VIA AN OVER-THE-TOP (OTT) CALL SERVICE, BASED ON CONNECTION CHARACTERISTICS

(71) Applicant: Tata Communications (America) Inc., Herndon, VA (US)

(72) Inventors: Manish Arora, Edison, NJ (US); Kumar Thirumalaiappan, Edison, NJ (US); Carlos Miranda, Deerfield Beach, FL (US)

(73) Assignee: Tata Communications (America) Inc., Herndon, VA (US)

( * ) Notice: Subject to any disclaimer, the term of this patent is extended or adjusted under 35 U.S.C. 154(b) by 424 days.

(21) Appl. No.: 15/199,213

(22) Filed: Jun. 30, 2016

(65) Prior Publication Data

US 2017/0019434 A1 Jan. 19, 2017

Related U.S. Application Data

(60) Provisional application No. 62/192,383, filed on Jul. 14, 2015.

(51) Int. Cl.
*G06F 15/16* (2006.01)
*H04L 29/06* (2006.01)
(Continued)

(52) U.S. Cl.
CPC ...... *H04L 65/1069* (2013.01); *H04L 65/1086* (2013.01); *H04L 65/1096* (2013.01);
(Continued)

(58) Field of Classification Search
CPC ......... H04N 21/4532; H04N 21/25891; H04N 21/84; H04N 21/41407; H04N 21/4147;
(Continued)

(56) References Cited

U.S. PATENT DOCUMENTS

2013/0276017 A1* 10/2013 Walker ............. H04N 21/44204 725/25
2014/0235291 A1* 8/2014 Chow ................... H04M 15/06 455/552.1

(Continued)

*Primary Examiner* — Michael A Keller
*Assistant Examiner* — Thao D Duong
(74) *Attorney, Agent, or Firm* — Kaplan Breyer Schwarz, LLP

(57) ABSTRACT

A system and method for connecting a call from an originating endpoint of a calling party to a terminating endpoint of a called party. The system comprises: a first computer system configured to i) receive, from a second computer system, a plurality of subscriber identifiers for a first over-the-top (OTT) call service, comprising a subscriber identifier of the called party, ii) receive, from a third computer system, a first series of plural updates for a predetermined connection characteristic and corresponding to the subscriber identifier of the called party, and iii) generate a signal for controlling the call, wherein the signal indicates to route the call either a) via the first OTT call service or b) via a different call service, based the first series of plural updates; and a networking device configured to route the call to the terminating endpoint, based on the signal.

10 Claims, 7 Drawing Sheets

(51) Int. Cl.
*H04M 7/12* (2006.01)
*H04L 29/08* (2006.01)
*H04M 7/00* (2006.01)

(52) U.S. Cl.
CPC .......... *H04L 67/02* (2013.01); *H04M 7/1285* (2013.01); *H04M 7/0075* (2013.01)

(58) Field of Classification Search
CPC .......... H04N 21/4821; H04N 21/8456; H04N 21/26258; H04N 21/44222; H04L 67/10
See application file for complete search history.

(56) References Cited

U.S. PATENT DOCUMENTS

| | | | |
|---|---|---|---|
| 2015/0085664 A1* | 3/2015 | Sachdev | H04L 41/5019 370/236 |
| 2016/0127538 A1* | 5/2016 | Barth | H04M 7/1285 379/22.03 |
| 2016/0127539 A1* | 5/2016 | Sharma | H04M 3/36 379/112.09 |

* cited by examiner

10,447,740 B2

SYSTEM AND METHOD FOR CALL TERMINATION VIA AN OVER-THE-TOP (OTT) CALL SERVICE, BASED ON CONNECTION CHARACTERISTICS

CROSS REFERENCE TO RELATED APPLICATION

The following document is incorporated by reference herein: U.S. Provisional Application Ser. No. 62/192,383, filed Jul. 14, 2015. If there are any contradictions or inconsistencies in language between this application and the document that has been incorporated by reference that might affect the interpretation of the claims in this application, the claims in this application should be interpreted to be consistent with the language in this application.

FIELD OF THE INVENTION

The present invention relates to telecommunications in general, and, more particularly, to setting up a call from an originating telecommunication endpoint of a calling party to a terminating telecommunication endpoint of a called party through an over-the-top (OTT) call service, based on one or more connection characteristics pertinent to the terminating telecommunication endpoint or the called party, or both.

BACKGROUND OF THE INVENTION

Over-the-top (OTT) services in general include a wide range of content delivery through software applications running on user devices and through third-party services that are independent of the underlying communication infrastructure technology. An OTT call service delivers in particular at least one of voice, messaging, and video services to its subscribers. Some examples of OTT call services are Skype, Google Hangouts, Viber, WeChat, Facebook Messenger, Apple Facetime, WhatsApp, and SnapChat.

From an end-user subscriber's perspective, an OTT service is received over the Internet, but delivery is not controlled (e.g., switched, etc.) directly by the end-user's communication service provider, which merely acts as a data "pipe" in this case. Accordingly, OTT service is accessed directly through an Internet-connected user device, which is also referred to as a "telecommunication endpoint" or just "endpoint." Examples of such endpoints are personal computers, laptops, tablets, smartphones, and other web-enabled devices.

FIG. 1 depicts telecommunications system 100 in the prior art, which comprises the aforementioned elements. In particular, telecommunications system 100 comprises Internet 101, communication service provider networks 102-1 through 102-4, local area networks 103-1 and 103-2, and telecommunication endpoints 104-1 through 104-7, interrelated as shown.

Internet 101 represents the Internet, the global system of interconnected computer networks that use the Internet protocol suite (TCP/IP) to link billions of user devices and networking devices worldwide.

Communication service provider (CSP) network 102-i, wherein i as depicted has a value of between 1 and 4, inclusive, is a network that transports information electronically. CSP network 102-i provides user devices of its end users—for example, endpoints 104-1 through 104-7—with access to Internet 101. CSP network 102-i can also provide each endpoint with connectivity to one or more other endpoints, either through Internet 101 or not. In some operating environments, CSP network 102-i provides such access to a local area network (LAN), such as LAN 103-1 or 103-2, which in turn provides access to the end user.

Telecommunication endpoint 104-k, wherein k as depicted has a value of between 1 and 7, inclusive, is a user device that enables its user (e.g., human, machine, etc.) to telecommunicate with resources within Internet 101, with other endpoints, and/or with other resources within telecommunications system 100.

At least some of the endpoints depicted in FIG. 1 are capable of executing one or more OTT software applications or "apps". An OTT app enables the endpoint, and thus its user, to access the corresponding OTT call service, as a called party or a calling party in a given call. By processing a call via an OTT app, an endpoint uses the CSP network infrastructure to access the Internet, in order to access the corresponding OTT call service to complete the call. This is, in contrast, to the endpoint relying directly on the host CSP network itself to handle at least some of the call control and switching of the call. In other words, an OTT-based call is transparent to the host CSP network, other than for providing exchanging of data between the endpoint and the Internet-based OTT call service platform.

FIG. 2 depicts Internet 101 within telecommunications system 100. Internet 101 comprises one or more call service platforms, including computer system 201 within OTT data center 202. System 201 provides the administration and control of a given OTT call service.

Data center computer system 201 receives data from computer systems 202-1, 202-2, and 202-3 within OTT Points-of-Presence (PoP) 203-1, 203-2, and 203-3 respectively. Each PoP acts as an access point to the OTT call service for end users within a given geographic region. Furthermore, computer system 201 aggregates the data for use in providing the OTT call service to one or more of the endpoints depicted in FIG. 1. OTT PoP computer system 203-1 is situated in a first geographic region (e.g., Europe, etc.) and monitors changes in one or more connection characteristics for all subscribing endpoints being served by CSP networks 102-1 and 102-2 within the first geographic area. OTT PoP computer system 203-2 is situated in a second geographic region (e.g., Asia, etc.) and monitors changes in one or more connection characteristics for all subscribing endpoints being served by CSP network 102-4 within the second geographic area. And OTT PoP computer system 203-3 is situated in a third geographic region (e.g., Americas, etc.) and monitors changes in one or more connection characteristics for all subscribing endpoints being served by CSP network 102-3 within the third geographic area.

FIG. 2 depicts a configured in which a single OTT call service is provided. In reality, many OTT call services are available, as enumerated above, and a given user may use multiple OTT call services, in part by having multiple OTT apps loaded on his device. As a result, the Internet 101 accommodates more than the one OTT call service depicted.

In order to connect a call through an OTT call service, multiple factors are typically considered. For example, one or more connection characteristics can be taken into account, in order to ensure that it is appropriate for a given OTT call service to handle a call to a given subscriber at a given moment in time. Such connection characteristics include the access network type that an endpoint is presently capable of accessing, the quality (e.g., signal strength, etc.) of each candidate access network, the presence status of the end user, and whether the user is even opted in to the OTT service.

Computer system 201 within central OTT data center 202 can provide subscriber-related information, such as subscriber identifiers, to a different processing system within Internet 101, typically in a batch format. Computer system 201 can also provide at least some of the connection characteristic information disclosed above to the other processing system.

In regard to connecting a call from an originating endpoint of a calling party to a terminating endpoint of a called party, a telecommunications system that includes one or more OTT call services, such as system 100, provides additional flexibility as to how the call may be connected. For example, the call can be delivered to the terminating endpoint of the called party through any of the one or more OTT call services to which the called party is subscribed, or through the intrinsic call service of the called party's communication service platform, such as CSP network 102-i. Consequently, however, the complexity of the telecommunications system also increases. For example, and as mentioned earlier, the telecommunications system has to also account for the connection characteristics, which can change frequently and continually.

SUMMARY OF THE INVENTION

The present invention enables the connecting of a call from an originating endpoint of a calling party to a terminating endpoint of a called party while accounting for updates from one or more over-the-top (OTT) call services that are subscribed to by the called party. A computer system of the illustrative embodiment determines whether to connect the call to the terminating endpoint of the called party via a particular OTT call service, or not, based on one or more series of plural updates that are received for a predetermined connection characteristic. Each series of updates is received from each OTT call service to which the called party is subscribed, for one or more subscribed-to OTT call services.

The connection characteristics pertain to the terminating telecommunication endpoint or to the called party, or both. The connection characteristics can include the access network type that an endpoint is presently capable of accessing, the quality of each candidate access network, the presence status of the end user, and whether the user is opted in to the OTT service or opted out. In some embodiments, the called party can have a first endpoint configured to receive a call via a first OTT service, a second endpoint configured to receive the call via a second OTT service, and so on, wherein the computer system of the illustrative embodiment can account for connection characteristics that are pertinent to each endpoint.

The computer system of the illustrative embodiment receives the series of updates from an OTT call service, for each OTT call service to which the parties are subscribed. The computer system is made aware of each party through a different update process than by which each series of connection characteristic updates is received. For example, the subscriber identifiers that correspond to the parties can be received via a batch process, while the series of updates can be received in real-time or near real-time. The system then generates a signal for a controlling a call, wherein the signal indicates to route the call either i) via the first OTT call service or ii) via a different call service, based on one or more series of updates that correspond to the called party. The call is then routed based on the signal.

The call handling technique of the illustrative embodiment is advantageous, in that by using a mechanism to obtain connection characteristic updates that pertain to each called party that is different from the pre-existing mechanism to obtain subscriber identifiers for each OTT call service, the technique is able to route each call to each called party based on better (e.g., newer, etc.) data. Furthermore, the use of plural connection characteristic updates, rather than a single snapshot of the connection characteristic, also improves performance—for example, by considering patterns of two or more updates.

An illustrative system for connecting a call from an originating endpoint of a calling party to a terminating endpoint of a called party comprises: a first computer system configured to: receive, from a second computer system, a plurality of subscriber identifiers for a first over-the-top (OTT) call service, comprising a subscriber identifier of the called party, receive, from a third computer system, a first series of plural updates for a predetermined connection characteristic and corresponding to the subscriber identifier of the called party, and generate a signal for controlling the call, wherein the signal indicates to route the call either i) via the first OTT call service or ii) via a different call service, based the first series of plural updates; and a networking device configured to route the call to the terminating endpoint, based on the signal.

An illustrative method for connecting a call from an originating endpoint of a calling party to a terminating endpoint of a called party comprises: receiving, by a first computer system from a second computer system, a plurality of subscriber identifiers for a first over-the-top (OTT) call service, comprising a subscriber identifier of the called party; receiving, by the first computer system from a third computer system, a first series of plural updates for a predetermined connection characteristic and corresponding to the subscriber identifier of the called party; generating, by the first computer system, a signal for controlling the call, wherein the signal indicates to route the call either i) via the first OTT call service or ii) via a different call service, based the first series of plural updates; and routing the call to the terminating endpoint, based on the signal.

Another illustrative system for connecting a call from an originating endpoint of a calling party to a terminating endpoint of a called party comprises: a first computer system configured to: receive, from a second computer system, a first series of plural updates for a predetermined connection characteristic and corresponding to a subscriber identifier for a first over-the-top (OTT) call service subscribed to by the called party, receive, from a third computer system, a second series of plural updates for the predetermined connection characteristic and corresponding to a subscriber identifier for a second OTT call service subscribed to by the called party, and generate a signal for controlling the call, wherein the signal indicates to route the call either i) via the first OTT call service or ii) via the second OTT call service, based the first and second series of plural updates; and a networking device configured to route the call to the terminating endpoint, based on the signal.

Another illustrative method for connecting a call from an originating endpoint of a calling party to a terminating endpoint of a called party comprises: receiving, by the first computer system from a second computer system, a first series of plural updates for a predetermined connection characteristic and corresponding to a subscriber identifier for a first over-the-top (OTT) call service subscribed to by the called party; receiving, by the first computer system from a third computer system, a second series of plural updates for the predetermined connection characteristic and corresponding to a subscriber identifier for a second OTT call service subscribed to by the called party; generating, by the first computer system, a signal for controlling the call, wherein the signal indicates to route the call either i) via the first OTT call service or ii) via the second OTT call service, based the first and second series of plural updates; and routing the call to the terminating endpoint, based on the signal.

DETAILED DESCRIPTION

"App"—For the purposes of this specification, the phrase "app" is an application downloaded to and executed by a wireless terminal or other mobile device.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Originating endpoint—For the purposes of this specification, the phrase "originating endpoint" is defined as "the endpoint of the calling party who initiates a call."

Plural—For the purposes of this specification, the phrase "plural" is defined as "more than one in number."

Processor—For the purposes of this specification, a "processor" is defined as hardware or hardware and software that perform mathematical and/or logical operations. A processor can be one or more computational elements, whether co-located or not and whether networked together or not.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Series—For the purposes of this specification, the phrase "series" is defined as "a number of things or events that are arranged or happen one after the other."

Terminating endpoint—For the purposes of this specification, the phrase "terminating endpoint" is defined as "the endpoint of the called party who receives a call." "Call termination" refers to the routing of telephone calls from one telephone company, also known as a carrier or provider, to another, in which the terminating point is the "terminating endpoint." "Terminating" a call is different than "ending" or "releasing" a call.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Update—For the purposes of this specification, the phrase "update" is defined as "an updated version of something."

Figure 3:
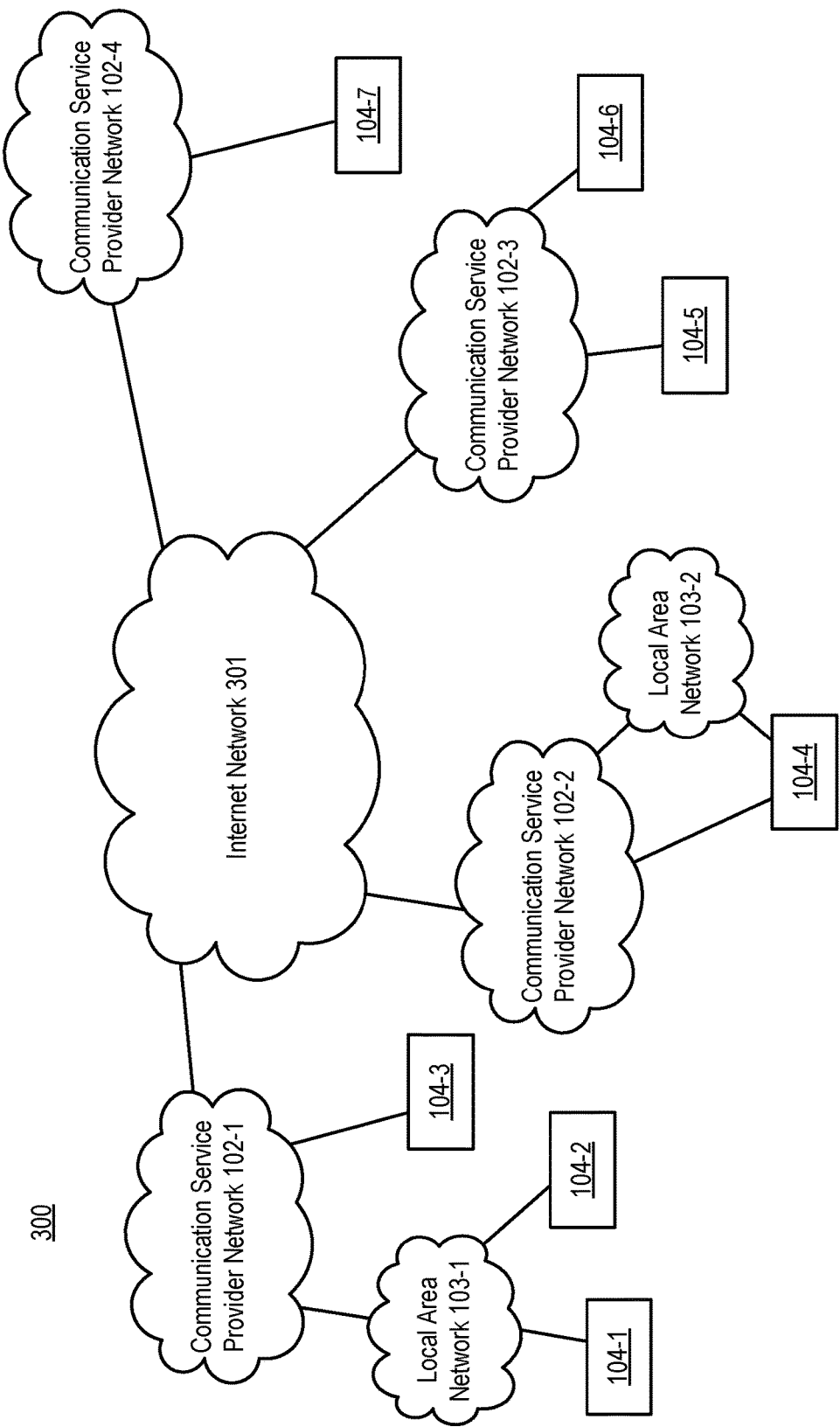
FIG. 3 depicts telecommunications system 300, in accordance with the illustrative embodiment of the present invention.

FIG. 3 depicts telecommunications system 300, in accordance with the illustrative embodiment of the present invention. Telecommunications system 300 comprises Internet network 301, communication service provider networks 102-1 through 102-4, local area networks 103-1 and 103-2, and telecommunication endpoints 104-1 through 104-7, interrelated as shown.

Internet network 301 comprises at least a portion of the Internet, the global system of interconnected computer networks that use the Internet protocol suite (TCP/IP) to link billions of user devices and networking devices worldwide. Internet network 301 comprises a plurality of Internet service provider (ISP) networks of various forms. An ISP is an organization that provides services for accessing, using, and/or participating in the Internet. It provides services for accessing, using, and/or participating in the Internet, through its communications network. Some of the more specific classifications of an ISP network is "local", "tier 2", and "tier 1", as described elsewhere in this specification.

Internet network 301 comprises computer- and/or telecommunications-networking devices, which can include gateways, routers, network bridges, switches, hubs, and repeaters. The networking devices that constitute the networks depicted in FIG. 3 can also include hybrid network devices such as multilayer switches, protocol converters, bridge routers, proxy servers, firewalls, network address translators, multiplexers, network interface controllers, wireless network interface controllers, modems, ISDN terminal adapters, line drivers, wireless access points, networking cables, and other related hardware. At least some of the networking devices that are present in Internet network 301, as well as elsewhere within telecommunications system 300, use routing tables in their operating system to direct IP packets to the next-hop router or destination. Routing tables are maintained by manual configuration or automatically by routing protocols.

Internet service providers whose networks constitute Internet network 301, as well as other elements within telecommunications system 300, establish the worldwide connectivity between individual networks at various levels of scope. At the bottom of the Internet routing hierarchy are those telecommunication endpoints 104-1 through 104-7 that can access the Internet. At the top of the Internet routing hierarchy are the tier 1 networks, including tier-1 network 420 described below and with respect to FIG. 4, large telecommunication companies that exchange traffic directly with each other via peering agreements. In at least some embodiments of the present invention, a tier 1 network can reach every other network on the Internet without purchasing IP transit or paying settlements; by this definition, a tier 1 network is a transit-free network that peers with every other tier 1 network. Tier 2 and lower level networks buy Internet transit from other providers to reach at least some parties on the global Internet, though they might also engage in peering. An Internet service provider may use a single upstream provider for connectivity, or implement multihoming to achieve redundancy and load balancing. Internet exchange points are major traffic exchanges with physical connections to multiple Internet service providers.

Communication service provider (CSP) network 102-i, wherein i as depicted has a value of between 1 and 4, inclusive, is a network that transports information electronically. In accordance with the illustrative embodiment of the present invention, CSP network 102-i is that of a telecommunications service provider (TSP). A TSP can be an incumbent local exchange carrier, a competitive local exchange carrier, and/or a mobile wireless communication company, for example and without limitation. In some embodiments of the present invention, CSP network 102-i can include or alternatively be the network of an Internet provider, a cable provider, a satellite provider, or a managed services business provider, for example and without limitation.

Communication service provider (CSP) network 102-i provides user devices of its end users—for example, endpoints 104-1 through 104-7—with access to Internet network 301. Communication service provider (CSP) network 102-i can also provide each endpoint with connectivity to one or more other endpoints, either through Internet network 301 or not. In some operating environments, CSP network 102-i provides such access to a local area network (LAN), which in turn provides access to the end user. As depicted, the communication provider networks are outside of Internet network 301. In some other embodiments, however, one or more of the communication service provider networks can be considered as part of Internet network 301 (e.g., some local Internet service provider networks, etc.).

Each CSP network 102-i comprises computer- and/or telecommunications-networking devices, which can include gateways, routers, network bridges, switches, hubs, and repeaters. The networking devices that constitute the networks depicted in FIG. 3 can also include hybrid network devices such as multilayer switches, protocol converters, bridge routers, proxy servers, firewalls, network address translators, multiplexers, network interface controllers, wireless network interface controllers, modems, ISDN terminal adapters, line drivers, wireless access points, networking cables, and other related hardware. Furthermore, each CSP network provides endpoints with access via one or more access networks. An "access network" is the part of a telecommunications network that connects endpoints to theft immediate service provider network, in this case CSP network 102-i. The access networks conform to one or more telecommunications standards. Some examples of such telecommunications standards include, without limitation: Global System for Mobile Communications (GSM), Universal Mobile Telecommunications System (UMTS), 4G Long Term Evolution (LTE), CDMA-2000, IS-136 TDMA, IS-95 CDMA, 3G Wideband CDMA, IEEE 802.11 Wi-Fi, IEEE 802.16 WiMax, Bluetooth, LoRa, and so on. In at least some operating environments, the access network directly used by such endpoints is privately owned or maintained (e.g., a home LAN, a business enterprise, etc.), and is connected to the CSP network via a networking device (e.g., a router, etc.) associated with the private network.

Although four communication service provider networks are depicted, a different number of such networks can be present, as those who are skilled in the art will appreciate after reading this specification.

Local area network (LAN) 103-j, wherein j as depicted has a value of 1 or 2, is a computer network that interconnects computers (e.g., endpoint 104-1, endpoint 104-2, endpoint 104-4, etc.) within a limited area (e.g., residence, office building, school, etc.). LAN 103-j is based on a communication protocol such as, while not being limited to, Ethernet or WiFi.

Although two local area networks are depicted, a different number of such networks can be present, as those who are skilled in the art will appreciate after reading this specification.

Telecommunication endpoint 104-k, wherein k as depicted has a value of between 1 and 7, inclusive, is a user device that enables its user (e.g., human, machine, etc.) to telecommunicate with resources within Internet network 301, with other endpoints, and/or with other resources within telecommunications system 300. Endpoint 104-k is capable of telecommunications with or without a wire or tangible medium, such that some endpoints are wired, some endpoints are wireless, and some are both, in any combination. An endpoint can be mobile or immobile, and an endpoint can transmit or receive, or transmit and receive. An endpoint can be a wireless terminal, a cellular telephone or cellphone, a wireless transmit/receive unit (WTRU), a user equipment (UE), a mobile station, a fixed or mobile subscriber unit, a pager, a personal digital assistant (PDA), a smartphone, a tablet, a phablet, a smart watch, a desk set, a computer, or any other type of end-user device capable of operating in a telecommunications environment, for example and without limitation.

Endpoint 104-k is capable of providing access to its user via one or more access networks, as described above and in regard to CSP network 102-i. At least some endpoints are capable of communication via both a cellular access network and a LAN access network; such an endpoint is endpoint 104-4 as depicted, for example and without limitation. As already described, some examples of access networks include networks based on the following telecommunications standards, without limitation: Global System for Mobile Communications (GSM), Universal Mobile Telecommunications System (UMTS), Long Term Evolution (LTE), CDMA-2000, IS-136 TDMA, IS-95 CDMA, 3G Wideband CDMA, IEEE 802.11 Wi-Fi, IEEE 802.16 WiMax, Bluetooth, LoRa, and so on.

Although seven telecommunication endpoints are depicted in FIG. 3, a different number of such endpoints can be present, as those who are skilled in the art will appreciate after reading this specification. Furthermore, a different number than depicted can be associated with each communication service provider network 102-i and local area network 103-j. One or more endpoints can be associated with a given end user; in some embodiments of the present invention, a particular call can be delivered to a called party i) via a first endpoint and in accordance with a first outcome of the techniques disclosed herein, and/or ii) via a second endpoint and in accordance with a second outcome.

At least some of the endpoints depicted in FIG. 3 are capable of executing one or more over-the-top (OTT) software applications or "apps". An OTT app enables the endpoint, and thus its user, to access the corresponding OTT call service, as a called party or a calling party in a given call. By processing a call via an OTT app, an endpoint uses the CSP network infrastructure to access the Internet, in order to access the corresponding OTT call service to complete the call. This is, in contrast, to the endpoint relying directly on the host CSP network itself to handle at least some of the call control and switching of the call. In other words, an OTT-based call is transparent to the host CSP network, other than for providing data exchange between the endpoint and the Internet-based OTT call service platform.

Figure 4:
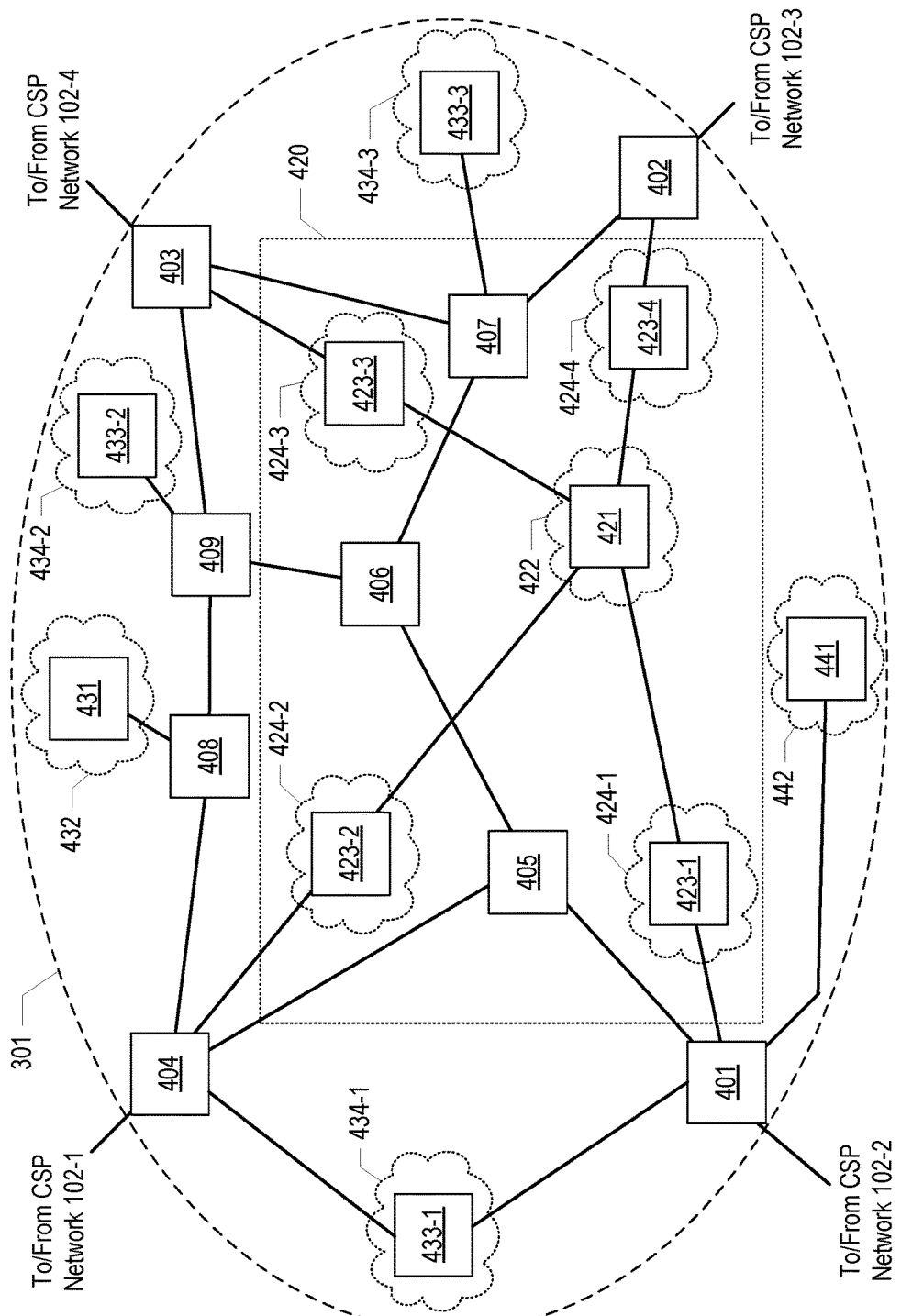
FIG. 4 depicts Internet network 301 within telecommunications system 300.

FIG. 4 depicts Internet network 301 within telecommunications system 300. Internet network 301 comprises one or more tier-level service provider networks, including central IP network 420. Each service provider network in Internet network 301 comprises one or more computer networking devices (e.g., routers, etc.). As depicted, Internet network 301 comprises routers 401 through 409 and various computer systems described below (e.g., server computers, etc.), interconnected as shown. Although nine routers are explicitly identified as such, network 301 can comprise any number of routers and networking devices in general.

Central IP network 420 comprises computer system 421, routers 405 through 407, and computer systems 423-1 through 423-4 within ISP Points-of-Presence (PoP) 424-1 through 424-4, respectively. Central IP network 420, an Internet service provider (ISP) network, serves as a central connection for at least some of the OTT call services provided within telecommunications system 300, in accordance with the illustrative embodiment of the present invention. Network 420 is capable of providing additional services as well. Network 420 can comprise any number of routers and networking devices in general.

ISP computer system 421 within data center 422 provides at least some of the call control for connecting a call from an originating endpoint of a calling party to a terminating endpoint of a called party, while accounting for one or more OTT call services that are subscribed to by the called party. Additionally, computer system 421 can also account for whether the calling party is using an OTT call service to place the call. For example and without limitation, computer system 421 can direct a call originated via a non-OTT call service or an OTT call service of the calling party, to a terminating endpoint via either a non-OTT call service or an OTT call service of the called party, based on one or more considerations that are disclosed herein. In order to coordinate these call control functions, ISP computer system 421 receives OTT-related data from one or more OTT data centers (e.g., OTT data center 432, OTT data center 442, etc.) and from one or more OTT Points-of-Presence (PoP) (e.g., OTT PoP 433-1 through 433-3, etc.), in accordance with the illustrative embodiment of the present invention.

In addition, ISP computer system 421 exchanges data with ISP PoP computer systems 423-1 through 423-4 within ISP Points-of-Presence (PoP) 424-1 through 424-4, respectively. Each ISP PoP acts as an access point to the ISP's call services for end users within a given geographic region and provides routing to and from that region. To that end, the ISP PoP computer systems, or other devices within the ISP PoPs comprise one or more networking devices (e.g., routers, etc.) that route calls based on one or more signals received from computer system 421 that are generated as described below.

ISP PoP computer systems 423-1 and 423-2 are situated to accommodate a first geographic region (e.g., Europe, etc.) and provide routing for all subscribing endpoints being served by CSP networks 102-1 and 102-2 within the first geographic area. ISP PoP computer system 423-3 is situated to accommodate a second geographic region (e.g., Asia, etc.) and provides routing for all subscribing endpoints being served by CSP network 102-4 within the second geographic area. And ISP PoP computer system 423-4 is situated in a third geographic region (e.g., Americas, etc.) and provides routing for all subscribing endpoints being served by CSP network 102-3 within the third geographic area.

Figure 5:
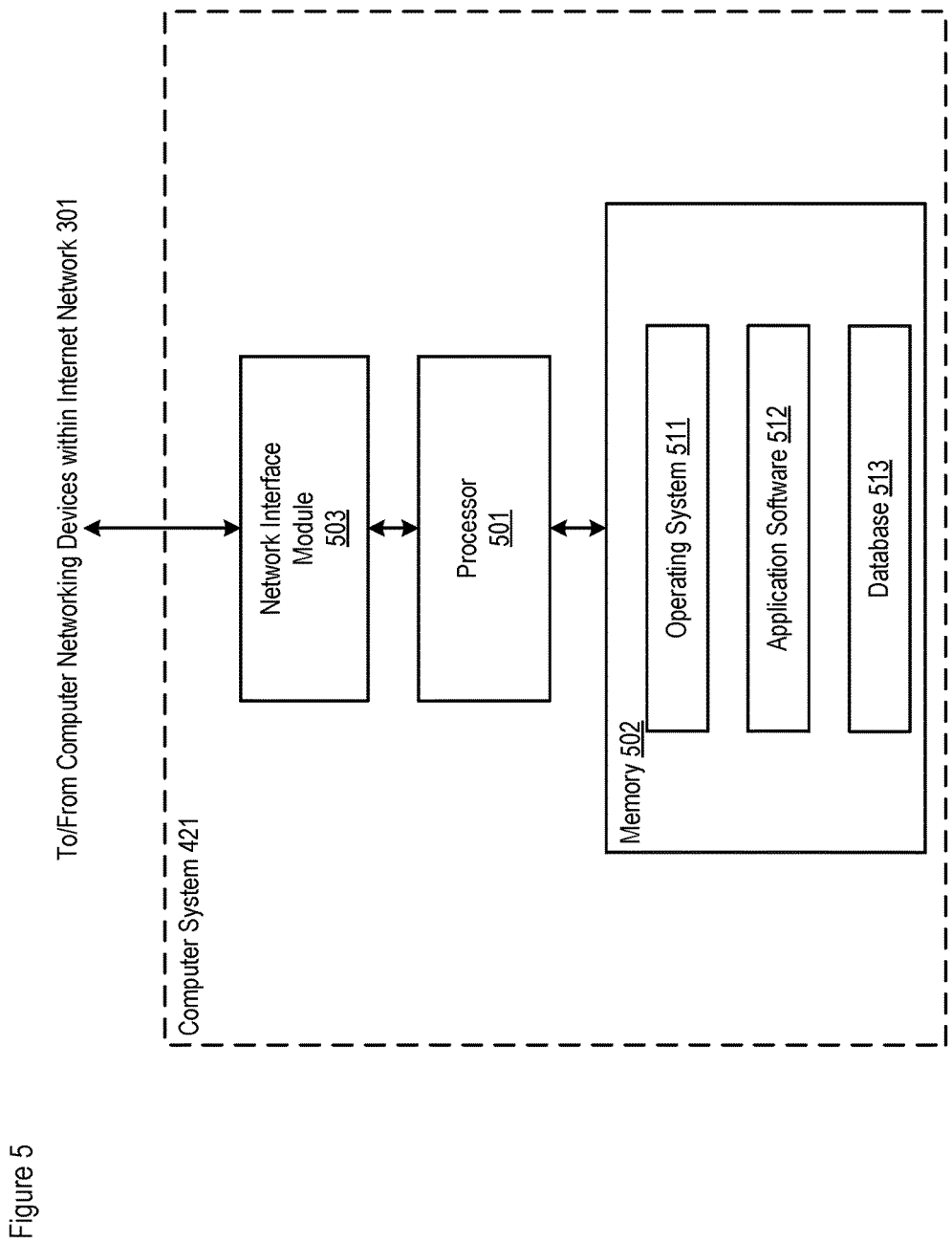
FIG. 5 depicts a block diagram of the salient components of computer system 421 within central IP network 420.

As described below and with respect to FIG. 5, ISP computer system 421, as part of ISP data center 422, comprises a server computer. ISP computer system 421 performs at least some of the controlling tasks described below and depicted in FIGS. 6 and 7.

As depicted, at least one computer-networking device is arranged between a networking device in network 420 and a CSP network 102-i, wherein the intermediate computer-networking device belongs to a different service provider network than network 420. For example and without limitation, router 401 is arranged between router 405 and communication service provider network 102-2. As those who are skilled in the art will appreciate after reading this specification, however, there can be any number of such intermediate devices, or no intermediate device at all, between network 420 and a CSP network 102-i, in various combinations between network 420 and the various CSP networks 102. Furthermore, where there are multiple intermediate devices between network 420 and a particular CSP network 102-i, different sets of these intermediate devices can belong to different service provider networks.

In accordance with the illustrative embodiment, network 420 is a tier 1 IP network. In some alternative embodiments of the present invention, however, network 420 can be a different type of service provider network, such as a tier 2 IP network, for example and without limitation. Furthermore, in some embodiments of the present invention, central IP network 420 can also serve as a backbone Internet service provider network as is known in the art and, as such, can be referred to as a "backbone service provider network."

Internet network 301 further comprises OTT computer systems 431 and 441 within OTT data centers 432 and 442, respectively, which provide the "OTT A" service and "OTT B" service, respectively. Some examples of OTT call services are Skype, Google Hangouts, Viber, WeChat, Facebook Messenger, Apple Facetime, WhatsApp, and SnapChat, for example and without limitation. Each data center service platform comprises a computer system comprising one or more server computers on which the respective OTT call service is hosted.

Figure 1:
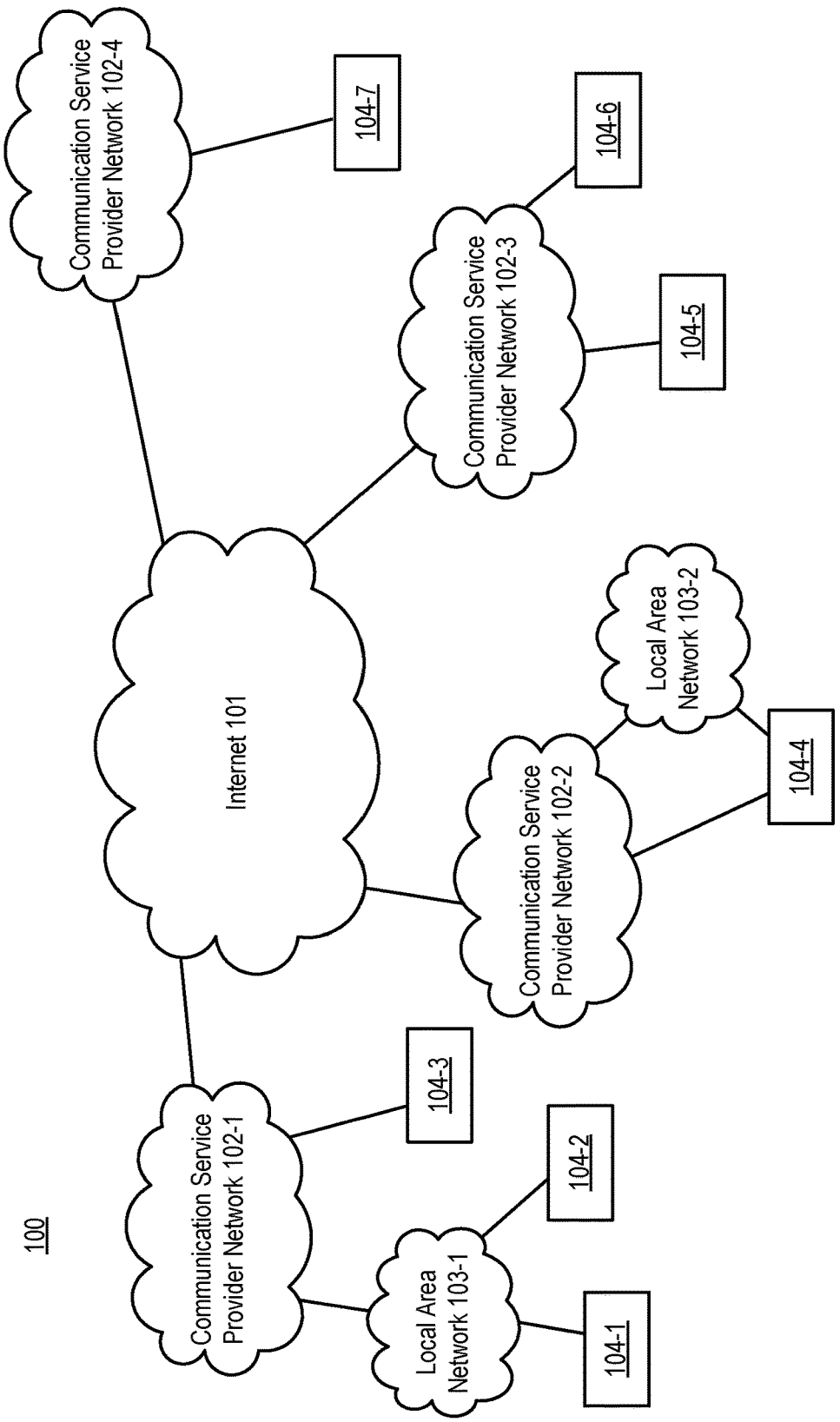
FIG. 1 depicts telecommunications system 100 in the prior art.
Figure 2:
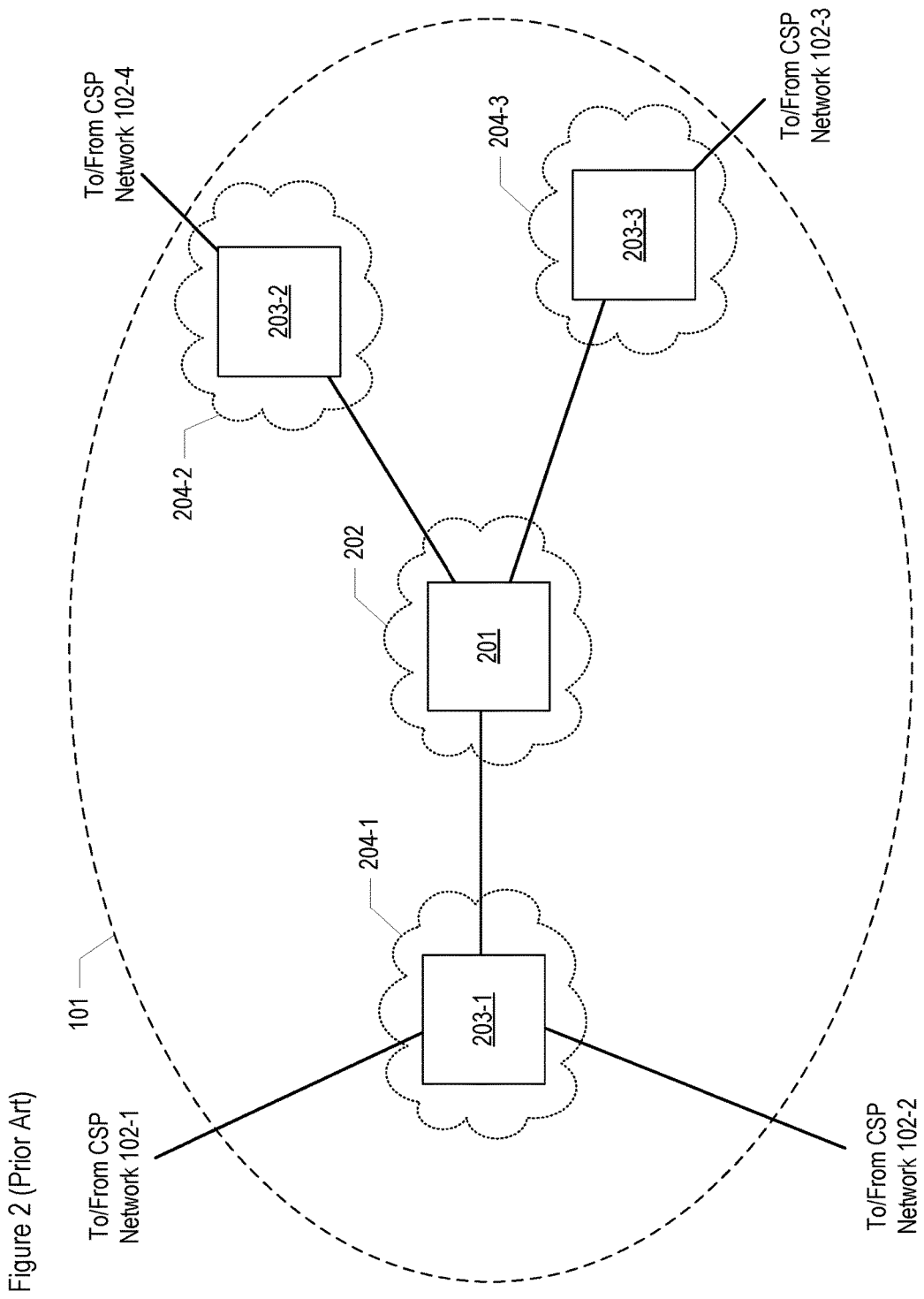
FIG. 2 depicts Internet 101 within telecommunications system 100.

Data center computer system 431 of OTT A service receives data from computer systems 433-1, 433-2, and 433-3 within OTT Points-of-Presence (PoP) 434-1, 434-2, and 434-3 respectively. Each PoP acts as an access point to the OTT call service for end users within a given geographic region. Furthermore, computer system 431 aggregates the data for use in providing the OTT call service to one or more of the endpoints depicted in FIG. 1. OTT PoP computer system 433-1 is situated in a first geographic region (e.g., Europe, etc.) and monitors changes in one or more connection characteristics for all subscribing endpoints being served by CSP networks 102-1 and 102-2 within the first geographic area. OTT PoP computer system 433-2 is situated in a second geographic region (e.g., Asia, etc.) and monitors changes in one or more connection characteristics for all subscribing endpoints being served by CSP network 102-4 within the second geographic area. And OTT PoP computer system 433-3 is situated in a third geographic region (e.g., Americas, etc.) and monitors changes in one or more connection characteristics for all subscribing endpoints being served by CSP network 102-3 within the third geographic area.

Similarly, computer system 441 of OTT B service receives data from the OTT PoP computer systems supporting subscribers of the OTT B service. These PoP computer systems are not depicted in FIG. 4, but are similar to those depicted as supporting subscribers to the OTT A service.

Although service platforms for two OTT call services are depicted, a different number of such services can be supported within Internet network 301, as those who are skilled in the art will appreciate after reading this specification. Furthermore, although OTT data centers 432 and 442 are depicted as being outside of IP network 420 and within Internet network 301, one or more service platforms can be situated within network 420. Also, one or more service platforms can be situated outside of Internet network 301, such as within a CSP network 102-i.

In accordance with the illustrative embodiment of the present invention, ISP data center 422 and OTT data centers 432 and 442 perform different functions. That is, computer system 421 coordinates the sharing of OTT-related data and the connecting of calls as described below, but does not itself host any OTT call service, while computer systems 431 and 441 host OTT call services, but do not perform the call-connecting functions of computer system 421.

FIG. 5 depicts a block diagram of the salient components of computer system 421 within central IP network 420, in accordance with the illustrative embodiment of the present invention. Computer system 421 comprises: processor 501, memory 502, and network interface module 503, which are interconnected as shown.

Computer system 421 comprises at least one server computer that performs at least some of the tasks disclosed herein. As those who are skilled in the art will appreciate after reading this specification, the hardware platform performing at least some of the tasks performed by computer system 421 can be embodied as a multi-processor platform, as a sub-component of a larger computing platform, as a virtual computing element, or in some other computing environment—all within the scope of the present invention.

As those who are skilled in the art will appreciate after reading this specification, computer system 421 can be a different type of apparatus than a server computer, and can be referred to by a different name such as a data-processing system, a computing device, or another type of hardware platform that comprises one or more processors, one or more memories, and one or more network interfaces, for example and without limitation.

Processor 501 is a general-purpose processor that is configured to execute operating system 511 and application software 512, and to populate, amend, use, and manage database 513, as described in detail below and in the accompanying figures.

Memory 502 is non-transitory and non-volatile computer storage memory technology that is well known in the art (e.g., flash memory, etc.). Memory 502 is configured to store operating system 511, application software 512, and database 513. The operating system is a collection of software that manages computer system 421's hardware resources and provides common services for computer programs, such as those that constitute the application software. The application software that is executed by processor 501 enables computer system 421 to perform at least some of the functions disclosed herein. Database 513 comprises subscriber identifiers and connection characteristics for each subscriber to each OTT call service, as described below and in FIGS. 6 and 7.

It will be clear to those having ordinary skill in the art how to make and use alternative embodiments that comprise more than one memory 502; or comprise subdivided segments of memory 502; or comprise a plurality of memory technologies that collectively store the operating system, application software, and database.

Network interface module 503 comprises a network adapter configured to enable computer system 421 to transmit information to and receive information from other parts of telecommunications system 300.

In regard to computer systems 423, 431, and 433, and 441, each of these computer systems is similar to computer system 421 described above and with respect to FIG. 5. Each of these computer systems comprises at least one server computer that performs at least some of the tasks disclosed herein. As those who are skilled in the art will appreciate after reading this specification, the hardware platform performing at least some of the tasks performed by one or more of computer systems 423, 431, and 433, and 441 can be embodied as a multi-processor platform, as a sub-component of a larger computing platform, as a virtual computing element, or in some other computing environment—all within the scope of the present invention.

As those who are skilled in the art will appreciate after reading this specification, any or all of computer systems 423, 431, and 433, and 441 can be a different type of apparatus than a server computer, and can be referred to by a different name such as a data-processing system, a computing device, or another type of hardware platform that comprises one or more processors, one or more memories, and one or more network interfaces, for example and without limitation.

Additionally, each OTT data center and/or OTT PoP can comprise multiple hardware platforms (e.g., server computers, etc.), wherein each hardware platform performs a different subset of the tasks disclosed herein. For example and without limitation, within OTT data center 432, the function of providing an OTT call service can be performed by any combination of one or more hardware platforms.

Figure 6:
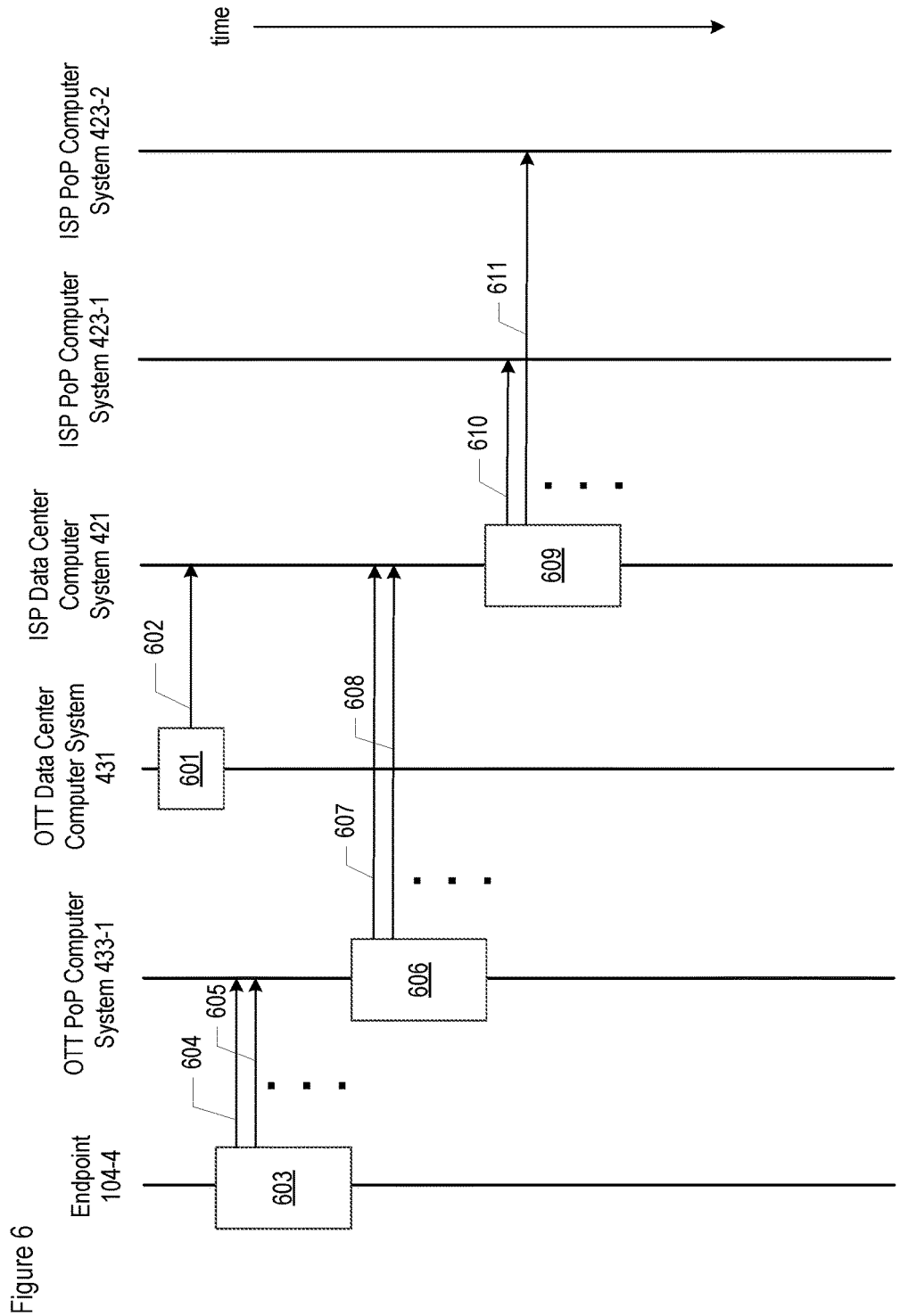
FIG. 6 depicts a message flow diagram of the salient processes for updating ISP data center computer system 421 and ISP PoP computer systems 432 with OTT-related information, in accordance with the illustrative embodiment of the present invention.
Figure 7:
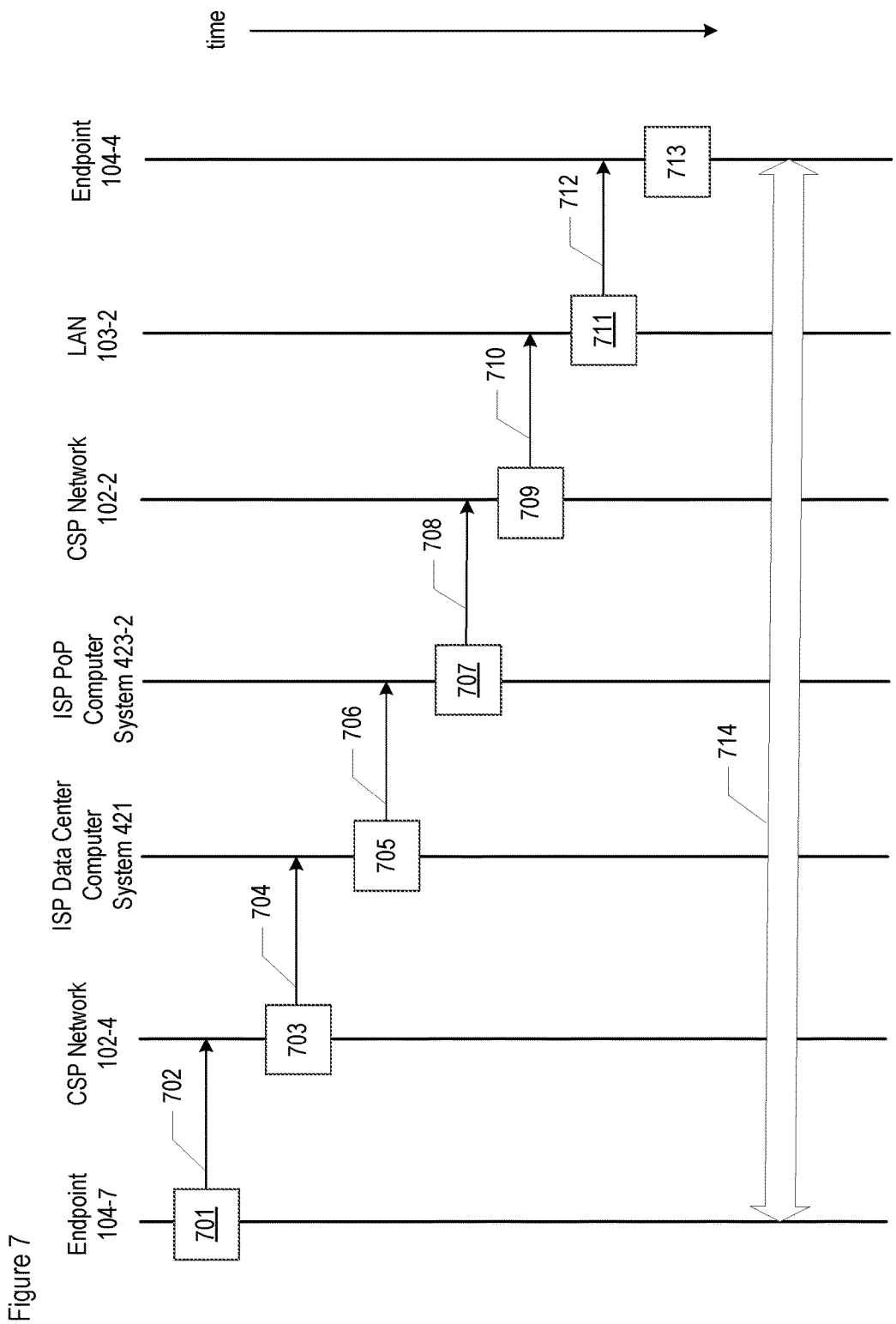
FIG. 7 depicts a message flow diagram of the salient processes for routing a call from an originating endpoint of a calling party to a terminating endpoint of a called party, in accordance with the illustrative embodiment of the present invention.

FIGS. 6 and 7 depict message flow diagrams that are representative of three respective operating scenarios of telecommunications system 300. Each operating scenario features a technique for routing a call from an originating endpoint of a calling party to a terminating endpoint of a called party.

As depicted in FIGS. 6 and 7, the processes performed by telecommunications system 300 of the illustrative embodiment are depicted in the drawings as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices than depicted. In some embodiments of the present invention, some of the depicted processes might be omitted.

Furthermore, for pedagogical purposes, a particular set of endpoints, networks, and servers are depicted as participating in the message flows. As those who are skilled in the art will appreciate, however, after reading this specification, other elements within telecommunications system 300 can participate in the message flows described herein.

FIG. 6 depicts a message flow diagram of the salient processes for updating ISP data center computer system 421 and ISP PoP computer systems 423-1 through 423-4 with OTT-related information, in accordance with the illustrative embodiment of the present invention.

Each OTT data center system transmits (e.g., periodically, sporadically, etc.) a plurality of subscriber identifiers for the corresponding OTT call service. For example, in accordance with process 601, OTT data center computer system 431 within central OTT data center 432 transmits via message 602 a plurality of subscriber identifiers for a first OTT service (i.e., OTT A service), including a subscriber identifier for the user of endpoint 104-4 and subscriber identifiers for other endpoints that are capable of using the first OTT service. In general, computer system 431 provides subscriber-related information, including the subscriber identifiers. In some embodiments, computer system 431 provides the plurality of subscriber identifiers in a batch format, in that the computer system does not transmit a change in, an addition of, or a deletion of a subscriber identifier whenever one occurs, but in a non-real-time manner (e.g., daily, weekly, monthly, infrequently, etc.). When it receives each message, ISP data center computer system 421 stores the subscriber information (e.g., identifiers, etc.) in its database.

Each endpoint transmits a series of updates for one or more predetermined connection characteristics, to the corresponding OTT PoP system that is handling the endpoint. For example, in accordance with process 603, endpoint 104-4 transmits the series of updates via messages 604 and 605 (and subsequent messages) to OTT PoP computer system 433-1 (i.e., the PoP that is handling endpoint 104-4 at that particular moment). Such connection characteristics include, but are not limited to:

i. the access network type that an endpoint is presently capable of accessing (e.g., 3G CDMA, 4G LTE, WiFi, etc.),
ii. the quality (e.g., signal strength, carrier-to-impairment ratio, signal-to-noise ratio, bit or frame error rate, etc.) of each candidate access network,
iii. the presence status (e.g., online, offline, away, do not disturb, etc.) of the end user, and
iv. whether the user is opted in to the OTT service or opted out.

In some embodiments, each endpoint transmits an update to a connection characteristic being reported whenever a change in value of the connection characteristic occurs.

In accordance with process 606, each OTT PoP computer system such as computer system 433-1 forwards the series updates via messages 607 and 608 (and subsequent messages) to ISP data center computer system 421. When it receives each message, ISP data center computer system 421 stores the connection characteristic values in its database, and for each subscriber being tracked.

In accordance with process 609, computer system 421 transmits the subscriber identifiers received via message 602 and the connection characteristics received via messages 607 and 608, to one or more ISP PoPs, including ISP PoP computer system 423-1 via message 610 and ISP PoP computer system 423-2 via message 611. In some embodiments, computer system 421 transmits the information to a particular ISP PoP based on the OTT PoP from which the information had originated. In some other embodiments, computer system 421 transmits the information to a particular ISP PoP based on its own tracking of where each endpoint is presently.

In some alternative embodiments of the present invention, one or more OTT PoP computer systems transmit the connection characteristic information, and possibly additional information (e.g., subscriber identifiers, etc.) directly to one or more ISP PoP computer systems.

FIG. 7 depicts a message flow diagram of the salient processes for routing a call from an originating endpoint of a calling party to a terminating endpoint of a called party based on a series of updates for a predetermined connection characteristic in an access network of the called party, in accordance with the illustrative embodiment of the present invention. At least some of the processes depicted in FIG. 7 occur concurrently with at least some of the processes depicted in FIG. 6.

In accordance with process 701, originating endpoint 104-7 detects its user attempting to place a call and, as a result, transmits via its access network message 702 comprising a dialed number, to CSP network 102-4. In some embodiments of the present invention, this is referred to as a "B-Number."

In accordance with process 703, CSP network 102-4, in response to receiving message 702, forwards the dialed number via message 704 to network 420, which routes the message to ISP data center computer system 421.

In accordance with process 705, computer system 421 processes the received indication of a call from originating endpoint 104-7, including the dialed number. System 421 accesses its database of subscriber identifiers previously received from the data centers of one or more OTT call services, in some embodiments by using the dialed number as an index. In this way, system 421 accesses updates of connection characteristics relevant to the called party specifically. In some embodiments of the present invention, the dialed number of the called party might correspond to more than one subscriber identifier, depending on whether the called party uses the same subscriber identifier or different subscriber identifiers across OTT call services to which she is subscribed. In some embodiments of the present invention, computer system 421 queries one or more OTT PoP computer systems or one or more OTT data centers, or both, in order to obtain updated information related to the subscriber who corresponds to the dialed number.

In order to connect a call through an OTT call service, computer system 421 considers one or more factors. For example, computer system 421 takes into account one or more connection characteristics, as received in messages 607 and 608 as part of a series of updates, in order to ensure that it is appropriate for a given OTT call service to handle a call to a given subscriber at a given moment in time.

Computer system 421 generates a signal for controlling the call, wherein the signal indicates to route the call either i) via a first OTT call service or ii) via a different call service, based on the series of updates. The different call service can be a second OTT call service, can be a call service that is intrinsic to CSP network 102-i (e.g., cellular service, etc.), or can be something else. In some embodiments of the present invention, the signal indicates to route the call, further based on one or more of the following, in any combination:

i. a second series of plural updates corresponding to the second OTT call service,
ii. how often an update occurs within a given series of plural updates,
iii. how an update occurs,
iv. how often an update occurs and/or how it occurs in relation to the (batch) message(s) of subscriber identifiers,
v. a relationship of a computer system providing the subscriber identifiers and a computer system providing the updates, to each other,
vi. the predetermined connection characteristic for which a given series of plural updates is received,
vii. a predetermined pattern of two or more updates within a given series,
viii. a comparison of updates across different connection characteristics,
ix. a comparison of i) at least a portion of the first series and ii) at least a portion of the second series, and x. the particular value or values of one or more updates in one or more series.

In some embodiments of the present invention, the signal indicates to route the call, further based on other data such as data for a route engine. For example and without limitation, such data can include traffic pattern data, quality data (e.g., call completion, call duration, seizure ratio, MOS, etc.), and margin per dollar attempt. At least some of this data is per OTT call service and can be used to bias an incoming call towards or away from one or more OTT call services and/or an intrinsic call service within CSP network 102-i.

System 421 then transmits the signal via message 706 to the PoP system handling the subscriber, in this case ISP PoP computer system 423-2.

In accordance with process 707, ISP PoP computer system 423-2, in response to receiving message 706 sets up the call on endpoint 104-4 and via the selected OTT call service (e.g., OTT A, OTT B, etc.) or CSP call service, in well-known fashion. This includes transmitting message 708 to CSP network 102-2.

In some alternative embodiments of the present invention, ISP PoP computer system 423-2 handles some of the actions otherwise performed by ISP data center computer system 421 and in accordance with process 705. For example and without limitation, computer system 421 can merely forward the incoming call information to the appropriate PoP computer system, wherein the PoP system generates the signal for controlling the call based on at least some of the details described above and in regard to process 705.

In accordance with process 709, CSP network 102-2 transmits message 710 to a router in LAN 103-2, an access network, in response to receiving message 708.

In accordance with process 711, the LAN 103-2 router transmits message 712 to terminating endpoint 104-4, in response to receiving message 710.

In accordance with process 713, terminating endpoint 104-4 commences the exchanging of data with originating endpoint 104-7 via data stream 714. The data is routed through one or more networking devices based, at least in part, on the signal generated in accordance with process 705.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system for connecting a call from an originating endpoint of a calling party to a terminating endpoint of a called party, comprising:
    a first computer system configured to:
        receive, from a second computer system, a plurality of subscriber identifiers for a first over-the-top (OTT) call service, comprising a subscriber identifier of the called party,
        receive, from a third computer system, a first series of plural updates for a predetermined connection characteristic and corresponding to the subscriber identifier of the called party,
        receive, from a fourth computer system, a plurality of subscriber identifiers for a second OTT call service,
        receive, from a fifth computer system, a second series of plural updates for the predetermined connection characteristic, and
        generate a signal for controlling the call, wherein the signal indicates to route the call either i) via the first OTT call service or ii) via the second OTT call service, based on the first and second series of plural updates; and
    a networking device configured to route the call to the terminating endpoint, based on the signal.

2. The system of claim 1, wherein the signal indicates to route the call, further based on how often an update occurs within the first series of plural updates.

3. The system of claim 1, wherein the signal indicates to route the call, further based on the predetermined connection characteristic for which the first series of plural updates is received.

4. The system of claim 1, wherein the signal indicates to route the call, further based on a predetermined pattern of updates within the first series.

5. The system of claim 1, wherein the signal indicates to route the call, further based on a comparison of i) at least a portion of the first series and ii) at least a portion of the second series.

6. A method for connecting a call from an originating endpoint of a calling party to a terminating endpoint of a called party, comprising:
    receiving, by a first computer system from a second computer system, a plurality of subscriber identifiers for a first over-the-top (OTT) call service, comprising a subscriber identifier of the called party;
    receiving, by the first computer system from a third computer system, a first series of plural updates for a predetermined connection characteristic and corresponding to the subscriber identifier of the called party;
    receiving, by the first computer system from a fourth computer system, a plurality of subscriber identifiers for a second OTT call service;
    receiving, by the first computer system from a fifth computer system, a second series of plural updates for the predetermined connection characteristic;
    generating, by the first computer system, a signal for controlling the call, wherein the signal indicates to route the call either i) via the first OTT call service or ii) via the second OTT call service, based on the first and second series of plural updates; and
    routing the call to the terminating endpoint, based on the signal.

7. The method of claim 6, wherein the signal indicates to route the call, further based on how often an update occurs within the first series of plural updates.

8. The method of claim 6, wherein the signal indicates to route the call, further based on the predetermined connection characteristic for which the first series of plural updates is received.

9. The method of claim 6, wherein the signal indicates to route the call, further based on a predetermined pattern of updates within the first series.

10. The method of claim 6, wherein the signal indicates to route the call, further based on a comparison of i) at least a portion of the first series and ii) at least a portion of the second series.

* * * * *